United States Patent
Astoria et al.

(10) Patent No.: US 11,499,201 B2
(45) Date of Patent: Nov. 15, 2022

(54) DIRECT REDUCTION PROCESS UTILIZING HYDROGEN

(71) Applicant: Midrex Technologies, Inc., Charlotte, NC (US)

(72) Inventors: Todd Michael Astoria, Harrisburg, NC (US); Gregory Darel Hughes, Charlotte, NC (US); Enrique Jose Cintron, Charlotte, NC (US); Keith Marshall Bastow-Cox, Charlotte, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 338 days.

(21) Appl. No.: 16/889,859

(22) Filed: Jun. 2, 2020

(65) Prior Publication Data

US 2020/0385827 A1     Dec. 10, 2020

Related U.S. Application Data

(60) Provisional application No. 62/857,843, filed on Jun. 6, 2019.

(51) Int. Cl.
| | | |
|---|---|---|
| *C21B 13/00* | (2006.01) | |
| *C21B 13/02* | (2006.01) | |
| *C25C 1/06* | (2006.01) | |

(52) U.S. Cl.
CPC .......... *C21B 13/0073* (2013.01); *C21B 13/02* (2013.01); *C25C 1/06* (2013.01); *C21B 2100/64* (2017.05)

(58) Field of Classification Search
CPC . C21B 13/0073; C21B 13/02; C21B 2100/64; C21B 2100/26; C25C 1/06; C25B 1/042; C21C 2100/04

(Continued)

(56) References Cited

U.S. PATENT DOCUMENTS

| 5,618,032 A | 4/1997 | Meissner et al. |
| 6,063,155 A * | 5/2000 | Masso ................. C21B 13/0033 75/452 |

(Continued)

FOREIGN PATENT DOCUMENTS

| EP | 2895631 B1 | 7/2018 |
| KR | 101551886 B1 | 9/2018 |

(Continued)

OTHER PUBLICATIONS

Kaczur et al. Carbon Dioxide and Water Electrolysis Using New Alkaline Stable Anion Membranes, Frontiers in Chemistry, Jul. 3, 2018 (Year: 2018).*

(Continued)

*Primary Examiner* — Brian D Walck
*Assistant Examiner* — Danielle M. Carda
(74) *Attorney, Agent, or Firm* — Clements Bernard Walker; Christopher L. Bernard; Christine Wilkes Beninati

(57) ABSTRACT

A process for the production of direct reduced iron (DRI), with or without carbon, using hydrogen, where the hydrogen is produced utilizing water generated internally from the process. The process is characterized by containing either one or two gas loops, one for affecting the reduction of the oxide and another for affecting the carburization of the DRI. The primary loop responsible for reduction recirculates used gas from the shaft furnace in a loop including a dry dedusting step, an oxygen removal step to generate the hydrogen, and a connection to the shaft furnace for reduction. In the absence of a second loop, this loop, in conjunction with natural gas addition, can be used to deposit carbon. A secondary carburizing loop installed downstream of the shaft furnace can more finely control carbon addition. This (Continued)

loop includes a reactor vessel, a dedusting step, and a gas separation unit.

12 Claims, 4 Drawing Sheets

(58) Field of Classification Search
USPC .......................................................... 75/492
See application file for complete search history.

(56) References Cited

U.S. PATENT DOCUMENTS

| | | |
|---|---|---|
| 8,496,730 B2 | 7/2013 | Metius et al. |
| 8,685,136 B2 | 4/2014 | Metius et al. |
| 2013/0205951 A1 | 4/2013 | Meissner et al. |
| 2013/0171049 A1* | 7/2013 | Metius ................ C21B 13/0073 422/187 |
| 2015/0259760 A1 | 9/2015 | Eder et al. |
| 2018/0036804 A1 | 2/2018 | Reid |

FOREIGN PATENT DOCUMENTS

| | | |
|---|---|---|
| WO | 2011116141 A2 | 9/2011 |
| WO | 2019042574 A1 | 3/2019 |
| WO | 2019219340 A1 | 11/2019 |

OTHER PUBLICATIONS

Sep. 28, 2020 International Search Report issued on International Application No. PCT/US2020/035635.

\* cited by examiner

111
DIRECT REDUCTION PROCESS UTILIZING HYDROGEN

CROSS-REFERENCE TO RELATED APPLICATION

The present disclosure claims the benefit of priority of co-pending U.S. Provisional Patent Application No. 62/857,843, filed on Jun. 6, 2019, and entitled "MIDREX PROCESS UTILIZING HYDROGEN," the contents of which are incorporated in full by reference herein.

TECHNICAL FIELD

The present disclosure relates generally to the direct reduced iron (DRI) and steelmaking fields. More specifically, the present disclosure relates generally to a process utilizing hydrogen, resulting in DRI having lower overall $CO_2$ emissions.

BACKGROUND

Most of the steel currently produced in the world is made via the blast furnace (BF) route or the electrical arc furnace (EAF) route. The BF route emits a large amount of $CO_2$, in the range of 1.6-2.0 kg $CO_2$/kg steel, and, despite many improvements, it is unlikely to reduce emissions significantly below this point. Because of the use of recycled scrap metal, the EAF route contributes significantly less $CO_2$ emissions, but still in the range of 0.5 kg $CO_2$/kg steel. Alternative iron units (AIUs, made from iron ore), such as DRI, hot briquetted iron (HBI), or pig iron are often required in the EAF to meet quality and productivity targets; these AIUs elevate the $CO_2$ emissions of the EAF—but the $CO_2$ emissions are still less than the BF route.

There has been a lot of effort recently to decarbonize the steel industry, with approaches like carbon capture or carbon avoidance. Recently, many European initiatives are looking at using green hydrogen (i.e. made from renewable energies) to reduce iron oxide to DRI and later melt it in an EAF (see e.g., EP2895631 B1). The referenced concept is deficient in that the process efficiency is inadequate to meet the demands of the market. In addition, there are operability issues that need to be overcome in order for the plant to operate properly. The problems to be solved include: avoiding unnecessary energy losses; managing the build-up of minor components in the recycle loop; and achieving the proper level of carbon that is needed for downstream steelmaking.

BRIEF DESCRIPTION OF THE DRAWINGS

The present disclosure is illustrated and described with reference to the various drawings, in which like reference numbers are used to denote like process components, as appropriate, and in which.

SUMMARY

Figure 1:
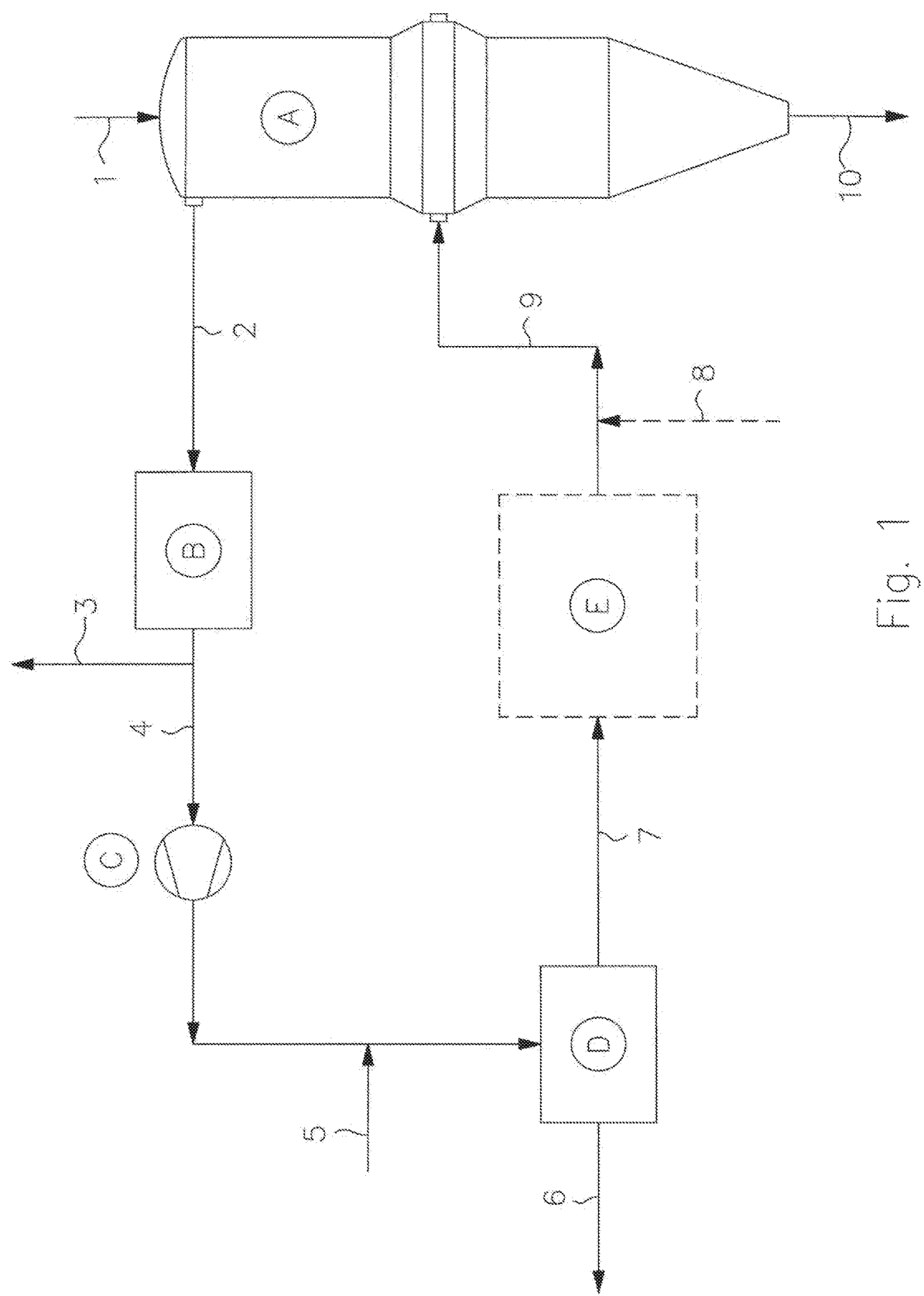
FIG. 1 is a schematic diagram illustrating one exemplary embodiment of the direct reduction (DR) process of the present disclosure, in which hydrogen generation is placed within the main process loop via an electrolyzer.

The present disclosure relates to an improvement for a process that utilizes hydrogen to produce DRI. At a general level, this process integrates the hydrogen production step within the main process gas loop. This is in contrast to other hydrogen-based DR processes, where hydrogen, or a precursor of hydrogen in the form of methane, is supplied as a fuel. The main steps of the process are: (a) recirculation of the spent reducing gas from the shaft furnace to an electrolyzer (i.e., oxygen-removal) step, preferably a solid oxide electrolyzer cell (SOEC); (b) a non-quenching dust collection step; (c) direct utilization of steam from the shaft furnace top gas to produce hydrogen; and (d) direct utilization of heat present in gas post electrolyzer.

The process mitigates the previously mentioned deficiencies through the removal of oxygen from the main process gas line. This process has significant advantages over the established methods for hydrogen reduction. These advantages include, but are not limited to: no externally supplied fuel gas required for reduction, decreasing local infrastructure requirements for the supply and storage of hydrogen or natural gas; limited water treatment, with the majority of the water required already present in the recycled top gas; minimum heat loss during the dedusting step; direct utilization of process gas sensible heat within the electrolyzer; and ease of integration with post reduction carburizing and other DRI carbon adjusting technologies.

In one exemplary embodiment, the present disclosure provides a method for the direct reduction of iron, including: using hydrogen as a chemical carrier for removal of oxygen from iron ore and regenerating resulting steam by electrolysis; wherein top gas from a shaft furnace is dedusted without condensing steam in the top gas; wherein no liquid water is added to a process loop associated with the method; and wherein the hydrogen is produced using water vapor present in the top gas from the shaft furnace using an electrolyzer forming a portion of the process loop. Optionally, the electrolyzer includes a solid oxide electrolyzer. Optionally, the method further includes compressing the top gas without cooling at a temperature above 100° C. Optionally, the method further includes adding oxygen to the hydrogen before introducing the hydrogen to the shaft furnace to reduce the iron ore. Optionally, the method further includes depositing carbon on direct reduced iron formed from the iron ore via the introduction of carburizing gas into the shaft furnace. Optionally, the carburizing gas is injected directly into the shaft furnace below a bustle thereof. Carbon dioxide is converted to carbon monoxide in the electrolyzer. A process gas of the process loop contains as much as 20% $CH_4$. Optionally, a purge stream of the process loop is integrated with a fired heater to heat bustle gas introduced into the shaft furnace. Optionally, a carburizing zone below a reduction zone of the shaft furnace is used to increase a direct reduced iron carbon percentage and the hydrogen is separated and delivered to the process loop, thereby forming a secondary gas loop including: solid material entering the carburization zone via gravity and interacting with a gas to add carbon to the direct reduced iron; a gas stream then exiting the carburizing zone and entering the dedusting step to remove solid particulates; hydrogen being removed from the gas using a gas separation unit and being returned to the process loop; natural gas or another carburizing gas being introduced into the gas; and a compressor being used to increase the pressure of the gas to provide motive force for gas circulation and separation. Optionally, the carburization zone is implemented in a separate vessel distinct from the shaft furnace.

In another exemplary embodiment, the present disclosure provides a system for the direct reduction of iron, including: a process loop using hydrogen as a chemical carrier for removal of oxygen from iron ore and regenerating resulting steam by electrolysis; a deduster operable for deducting top gas from a shaft furnace of the process loop without condensing steam in the top gas; wherein no liquid water is added to the process loop; and an electrolyzer operable for producing the hydrogen using water vapor present in the top gas from the shaft furnace and forming a portion of the process loop. Optionally, the electrolyzer includes a solid oxide electrolyzer. Optionally, the system also includes one or more of: a compressor operable for compressing the top gas without cooling at a temperature above 100° C.; an oxygen injector operable for adding oxygen to the hydrogen before introducing the hydrogen to the shaft furnace to reduce the iron ore; a carburizing gas injector operable for depositing carbon on direct reduced iron formed from the iron ore via the introduction of carburizing gas into the shaft furnace, wherein the carburizing gas is injected directly into the shaft furnace below a bustle thereof; and a purge stream integrated with a fired heater operable for heating bustle gas introduced into the shaft furnace. Optionally, a carburizing zone below a reduction zone of the shaft furnace is used to increase a direct reduced iron carbon percentage and the hydrogen is separated and delivered to the process loop, thereby forming a secondary gas loop including: solid material entering the carburization zone via gravity and interacting with a gas to add carbon to the direct reduced iron; a gas stream then exiting the carburizing zone and entering the dedusting step to remove solid particulates; hydrogen being removed from the gas using a gas separation unit and being returned to the process loop; natural gas or another carburizing gas being introduced into the gas; and a compressor being used to increase the pressure of the gas to provide motive force for gas circulation and separation; wherein the carburization zone is implemented one of in the shaft furnace and in a separate vessel distinct from the shaft furnace.

DESCRIPTION OF EXEMPLARY EMBODIMENTS

The present disclosure relates to a shaft furnace process for the direct reduction of iron ore using hydrogen. The process improves upon existing processes by better integrating the oxygen removal step (and, likewise, the hydrogen generating step) within the main gas recycle to reduce heat and material losses. Like in all DR processes, the gas used to reduce iron still retains unreacted reductants after passing through the shaft furnace. The effective use of this unreacted gas drives much of the economics around DRI plants, including hydrogen-based reduction. The present disclosure details a method for reducing iron that improves on the utilization of heat content, hydrogen, and water present in the gas recycle and also provides a means for adjusting the carbon content of the DRI.

To facilitate understanding, several figures are provided. FIG. 1. depicts the most basic form of the flowsheet of the present disclosure. FIG. 1 shows that solid iron oxide (1) enters via the top of the shaft furnace (A). As the iron oxide travels down the shaft furnace, it reduces to DRI in an environment consisting primarily of hydrogen. The DRI leaves the shaft furnace via gravity (10). Low pressure, spent reducing gas (2) (referred to as top gas) exits from the top of the shaft furnace and is sent to a non-quenching dust collection step (B) (i.e., dry dedusting—for example, via candle filters) in order to remove carry-over solids (i.e., fines). After dedusting, a purge stream (3) is present to control the system pressure and build up of inert gasses. The majority of the gas (4) (referred to as process gas) is recycled and compressed (C). Steam is added (5), then fed to an oxygen removal step (D). Oxygen is removed from the process (6) and the hydrogen generated is sent back to the shaft furnace (7). Depending on the exit conditions of the oxygen removal step, a gas heater (E) may be necessary to heat the hydrogen (9) (referred to as bustle gas) to reduction temperatures prior to introduction to the shaft furnace. Oxygen (8) may also be injected directly to the bustle gas (9) to raise its temperature.

This process has key advantages over conventional reduction processes. Placement of the hydrogen generation within the main process gas loop creates fuel within the process, limiting fuel handling requirements from outside the plant battery limits.

The right choice of electrolysis technology for the oxygen removal step (D) is important. To effectively utilize the process stream, the preferential choice of electrolyzer will act on water vapor present in the recycle gas stream. For this service, the use of a solid oxide electrolyzer cell (SOEC) is preferred. SOECs can handle high temperature streams with high hydrogen concentrations. This eliminates the need to separate or condense out water from the hydrogen present in the stream incoming to the electrolyzer (4). The composition of the top gas (2) is anywhere between 60% and 80% hydrogen by volume, but is typically maintained around 70%. To be a viable reducing gas for iron oxide, the outlet stream of the electrolyzer (7) has to minimize water content down to 6% or lower, ideally 0.5%. In some cases, a higher nitrogen percentage is used in the process gas and so these percentages would be adjusted down.

By utilizing the water already in a vapor phase in the top gas (2), the overall process avoids energy inefficiencies associated with condensing and reheating the water required to regenerate the hydrogen needed for reduction. Further efficiencies are obtained though the recycle of hydrogen back to the shaft furnace. SOEC units operate at temperatures to enable high temperature electrolysis, typically between 500 and 800° C. An electrolyzer operating at the higher end of this range can supply the temperature required for direct use of the generated reducing gas in the shaft furnace.

The temperature of the top gas (2) warrants further discussion. According to the embodiment of FIG. 1, the top gas temperatures can be in the range of 200-600° C. This temperature can be affected by a number of factors present in a particular facility. For example, the exiting top gas temperature can be higher if the iron oxide (1) is preheated before entering the shaft furnace or if a higher bustle gas flow is used to reduce a particularly difficult iron ore (normally >2000 $Nm^3$/t DRI for the process as described in FIG. 1).

The process gas loop can be designed for the temperature, and the heat can be utilized and not wasted. This contrasts with the conventional reduction processes where the higher top gas temperatures impose energy losses through condensing of water in the gas stream. With the methods of the present disclosure, heat is instead maintained within the process loop and utilized by the electrolyzer. This kind of integration also minimizes fuel consumption in the plant. Utilizing the water vapor within the gas provides a portion of the steam required for makeup to the process. This decreases costs for water treatment that would be required compared to a system that uses water in the liquid phase for the electrolyzer.

Another departure from the previous direct reduction technologies is the diminished purge stream from the gas loop. Traditional natural gas-based plants split a portion of the top gas (2) as a fuel source for the heating and reforming requirement of the chosen reforming technology. The portion of the top gas (2) that is split is referred to as top gas fuel. This stream serves two purposes. One purpose of the top gas fuel is to remove oxygen from the system in the form of water, carbon monoxide, and carbon dioxide. The other purpose is to recover some energy from the unused reducing gas as economically and efficiently as possible. The present process as described in FIG. 1 minimizes this purge from the top gas (2) by integrating the oxygen removal with the hydrogen generation in the electrolyzer (D) and is able to avoid the loss of reducing gas in the manner as described for the traditional natural gas-based technology.

An optional gas heater (E) can be used if sufficient heat is not present in the hydrogen after electrolysis. Hydrogen needs to be introduced to the shaft furnace at temperatures above 760° C. for effective reduction to occur. Because hydrogen reduction reactions are overall endothermic, and to account for heat losses in the duct, the operating temperature of the gas as it enters the shaft furnace (9) needs to be closer to 800-1000° C. There is flexibility in the type of gas heater chosen for FIG. 1. The preferred method is to use an electric heater as there is already a large electrical demand within the plant due to the presence of the electrolyzer (D). Gas-fired heaters are particularly common within the DRI industry and any external fuel can be used as an energy source—for example natural gas. While going against some previously discussed advantages, the hydrogen generated for the process can also be combusted to supply this energy. The purge stream (3) as a fuel source for the optional heater (E) is a possibility to integrate the process loop and combustion system similar to the conventional direct reduction flowsheet. Finally, oxygen (8) can be added directly to the bustle gas (9), since the gas is above autoignition temperature, as a source of energy. This process functions identically to the oxygen injection systems used in the conventional DRI facilities. The oxygen (8) can be from an external source, or it can come from the electrolyzer (D) itself.

Another consideration for the hydrogen reduction process is the presence of carbon in the product DRI. Carbon deposition is constrained by thermodynamics and is highly dependent on the temperature and composition of the gas stream. Deposition is favorable for gases at high temperatures and hydrogen-to-carbon ratios and declines with the presence of oxygen in compounds like water or carbon dioxide. In the conventional reduction process, natural gas is added to the transition zone within the shaft furnace beneath the bustle. There the gas deposits carbon at temperatures above 800° C.

Figure 2:
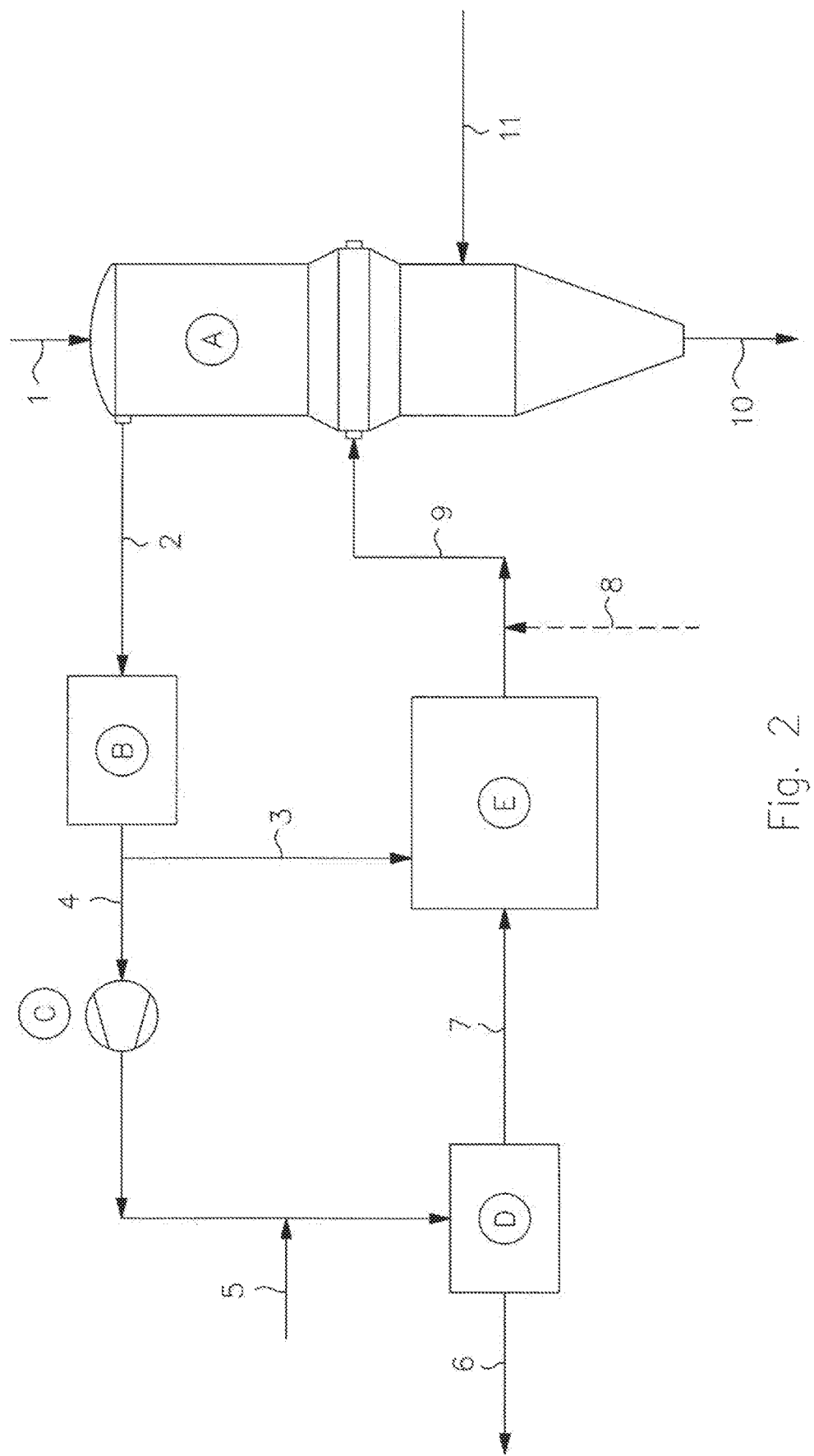
FIG. 2 is a schematic diagram illustrating another exemplary embodiment of the DR process of the present disclosure, in which the carbon content of the DRI is controlled via carburizing gas being directly injected to the shaft furnace and is dependent on the main process loop.
Figure 3:
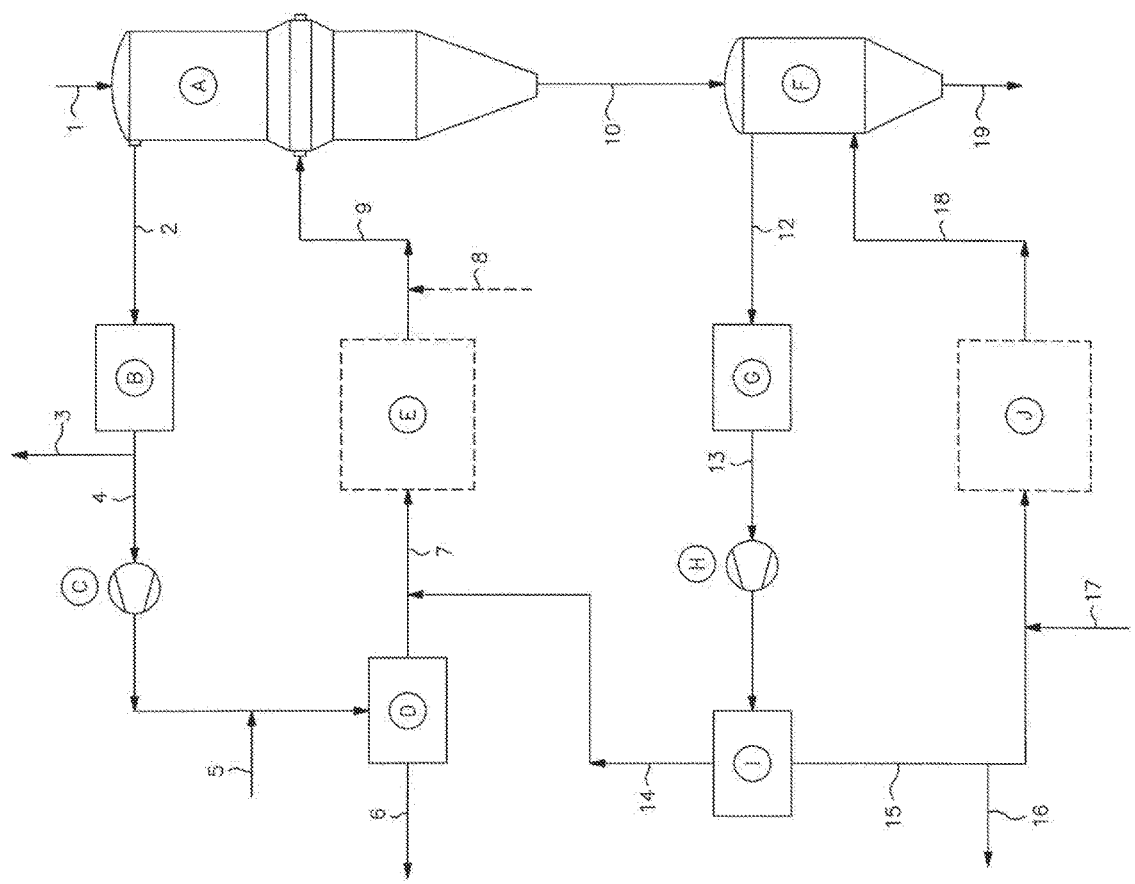
FIG. 3 is a schematic diagram illustrating a further exemplary embodiment of the DR process of the present disclosure, in which the carbon content of the DRI is controlled via a carburizing loop that functions independently of the main process loop in a separate vessel.
Figure 4:
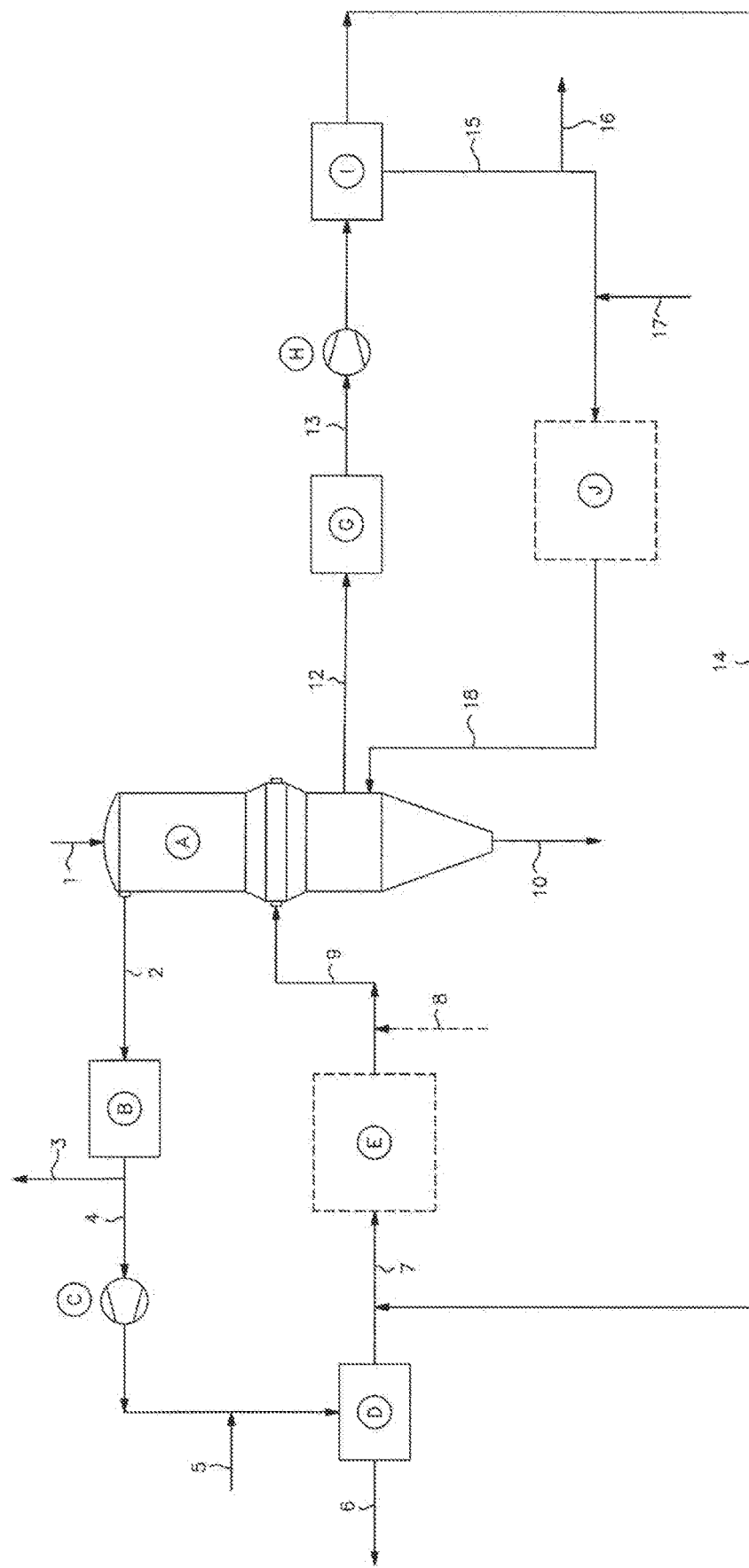
FIG. 4 is a schematic diagram illustrating a still further exemplary embodiment of the direct reduction process of the present disclosure in which carbon content of the DRI is controlled via a carburizing loop that functions independently of the main process loop in a single vessel.

Modifications to the hydrogen process are required to produce DRI with carbon levels like those of conventional natural gas-based direct reduction processes. This disclosure can be modified from the embodiment described by FIG. 1 to facilitate carbon addition by the select injection of carburizing gas. Additional embodiments of this disclosure for adding carbon are shown in FIG. 2, FIG. 3, and FIG. 4. FIG. 2 illustrates an example embodiment for a process where carburizing gas is introduced to the shaft furnace and carbon compounds are partially recirculated through the main process loop. FIG. 3 illustrates a process where a second loop is used to prevent the buildup of carbon compounds in the main loop and provide better control of the carburizing gas. FIG. 4 is a derivate of FIG. 3. These embodiments are discussed in more detail.

The embodiment illustrated in FIG. 2 shows a direct approach for the addition of carburizing gas. Equipment needed for this process is similar to that of the process from FIG. 1. Carburizing gas (11), typically natural gas, is added directly to the shaft furnace (A) in a location below the bustle (called the transition zone). The carburizing gas, now in contact with hot iron flowing down the shaft furnace (A), decomposes, which deposits carbon and generates hydrogen gas. As mentioned before, this process is thermodynamically limited. The unreacted methane travels up the shaft furnace where it joins the bustle gas (9). In the presence of water and iron, methane reforms and creates a larger endothermic load in the shaft furnace (A) than present in the first embodiment. For this embodiment, the bustle gas (9) temperature is increased to maintain reduction temperature using a gas-fired heater (E) after electrolysis. This heater is fired with gas from purge stream (3) as fuel.

This method of operation is feasible due to the higher purge rate (3) required from the addition of carburizing gas. The carburizing gas, in addition to bringing in carbon, also introduces carbon-bearing gases (from the unreacted methane) and hydrogen. Depending on operation, this means that the top gas (2) now contains as much as 20% methane by volume, but it is preferable to keep the composition down to 5% or 10%. Because of the process constraints for maintaining metallization and carbon, the amount of methane is only indirectly controlled. Some methane in the shaft furnace (A) reforms to carbon monoxide and hydrogen. Carbon dioxide that passes through the electrolyzer is converted to carbon monoxide where it can be used again in reduction. Water content can be adjusted through cooling and condensing a portion of the main process gas stream. This can be achieved in such a way to reduce the total gas volume without greatly affecting the heat content of the gas. Ultimately though, the excess gas must be vented in some way leading to some carbon emissions. This operation represents a fusion between conventional hydrogen processes and conventional natural gas-based processes where carbon bearing DRI can be produced with a fraction of the emissions.

Another embodiment is presented for the addition of carbon to DRI. This embodiment uses a second gas loop to control carburization. This embodiment can be done in a single vessel or in a separate vessel as seen in the difference between FIG. 3 and FIG. 4. The added control allows for the depositing of carbon without the presence of carbon in the main gas loop and thus limits the emission of carbon dioxide. The process is illustrated in FIG. 3. Here, a second vessel (F) below the shaft furnace (A) is used to add carbon to the DRI. The main process gas loop behaves similarly to the example in FIG. 1. What differs in this case is the solid product (10) generated at the exit of the shaft furnace (A) is introduced to a secondary carburizing reactor vessel (F). Here, carburizing gas (18) is introduced to the carburizing reactor vessel (F) to add carbon to the DRI. The gas from the carburizing vessel (12) is collected and the solid carry-over is removed in a dedusting step (G) to prevent damage to downstream equipment. For this particular configuration, the dedusting step (G) can be either wet-based or dry-based. The dedusted gas (13) is compressed (H) and sent to a gas separation step (I). The gas separation selectively removes hydrogen from the recycled carburizing gas and can be selected from known technology such as membrane separation or pressure swing absorption. This step provides an outlet for hydrogen generated from the carbon deposition reactions or entering downflow (10) from the shaft furnace (A). The hydrogen-rich stream (14) is sent back to the main process loop to be used as a reductant. The remaining stream (15) is enriched with a carbon-bearing gas (17) and reintroduced back to the carburizing reactor vessel (F). With sufficient hydrogen removal and/or carbon enrichment, the composition of the gas (18) will continue to remain favorable for carbon deposition.

A couple of extra features are depicted in FIG. 3 to illustrate a potential means to control and condition the carburizing gas (18). Pressure control can be achieved through a minor purge line (16). This also acts to prevent buildup of inert nitrogen from the seal gas, as well as any other undesirable components within the system. An optional gas heater (J) is also included as an example one may implement to gain better control over the energy requirements for carburization of the DRI.

Having a carburizing loop act independently of the main reduction loop also provides flexibility for what additional types of technologies can be used. For example, an Adjustable Carbon Technology (ACT) system can be used to generate carbon monoxide that can used to enrich the carburizing gas (17). This allows for further tailoring of the carburizing feed gas composition to meet the desired carbon product. While a strict separate vessel is not required to house the carburizing zone for the invention to perform, as seen in FIG. 4, the separation provides extra flexibility in sealing and controlling gas flows through the process, as well as allows for greater control over the carbon addition and carbon emissions. Without the flexibility of having an independent carburizing loop as depicted in FIG. 3, the product carbon would be limited by the operating conditions of the main process loop equipment (especially the electrolyzer), as discussed earlier.

Thus, the present disclosure provides a process for the production of direct reduced iron (DRI), with or without carbon, using hydrogen, where the hydrogen is produced utilizing water generated internally from the process. The process is characterized by containing either one or two gas loops, one for affecting the reduction of the oxide and another for affecting the carburization of the DRI. The primary loop responsible for reduction recirculates used gas from the shaft furnace in a loop including a dry dedusting step, an oxygen removal step to generate the hydrogen, and a connection to the shaft furnace for reduction. In the absence of a second loop, this loop, in conjunction with natural gas addition, can be used to deposit carbon. A secondary carburizing loop installed downstream of the shaft furnace can more finely control carbon addition. This loop includes a reactor vessel, a dedusting step, and a gas separation unit.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:
1. A method for the direct reduction of iron, comprising:
using hydrogen as a chemical carrier for removal of oxygen from iron ore and regenerating resulting steam by electrolysis;
wherein top gas from a shaft furnace is dedusted without condensing steam in the top gas;
wherein no liquid water is added to a process loop associated with the method;
wherein the hydrogen is produced using water vapor present in the top gas from the shaft furnace using an electrolyzer forming a portion of the process loop; and
wherein a carburizing zone below a reduction zone of the shaft furnace is used to increase a direct reduced iron carbon percentage and the hydrogen is separated and delivered to the process loop, thereby forming a secondary gas loop comprising:
solid material entering the carburization zone via gravity and interacting with a gas to add carbon to the direct reduced iron;
a gas stream then exiting the carburizing zone and entering the dedusting step to remove solid particulates;
hydrogen being removed from the gas using a gas separation unit and being returned to the process loop;
natural gas or another carburizing gas being introduced into the gas; and
a compressor being used to increase the pressure of the gas to provide motive force for gas circulation and separation.

2. The method of claim 1, wherein the electrolyzer comprises a solid oxide electrolyzer.

3. The method of claim 1, further comprising compressing the top gas, after the top gas is dedusted and prior to the electrolysis, without cooling at a temperature above 100° C.

4. The method of claim 1, further comprising adding oxygen to the hydrogen before introducing the hydrogen to the shaft furnace to reduce the iron ore.

5. The method of claim 1, further comprising depositing carbon on direct reduced iron formed from the iron ore via the introduction of carburizing gas into the shaft furnace.

6. The method of claim 5, wherein the carburizing gas is injected directly into the shaft furnace below a bustle thereof.

7. The method of claim 5, wherein carbon dioxide is converted to carbon monoxide in the electrolyzer.

8. The method of claim 5, wherein a process gas of the process loop contains as much as 20% $CH_4$.

9. The method of claim 5, wherein a purge stream of the process loop is integrated with a fired heater to heat bustle gas introduced into the shaft furnace.

10. The method of claim 1, wherein the carburization zone is implemented in a separate vessel distinct from the shaft furnace.

11. A method for the direct reduction of iron, comprising:
depositing carbon on direct reduced iron formed from solid iron ore in a direct reduction shaft furnace via introduction of carburizing gas into the direct reduction shaft furnace;
wherein the carburizing gas is injected directly into the direct reduction shaft furnace below a bustle thereof in a transition zone and contacts heated iron flowing down the direct reduction shaft furnace, decomposes, which deposits the carbon and generates hydrogen gas.

12. The method of claim 11, wherein temperature of bustle gas entering the direct reduction shaft furnace is increased to maintain reduction temperature using a gas fired heater after electrolysis; and wherein no externally supplied fuel gas is required for reduction.

\* \* \* \* \*